Patented Jan. 10, 1933                                            1,893,683

UNITED STATES PATENT OFFICE

CHARLES MARSHALL SAEGER, JR., OF BOWMANSTOWN, PENNSYLVANIA

CORE OR MOLD BINDER, COATING OR PASTE

No Drawing.       Application filed February 17, 1930. Serial No. 429,224.

(GRANTED UNDER THE ACT OF MARCH 3, 1883, AS AMENDED APRIL 30, 1928; 370 O. G. 757)

My invention relates to a new and useful improvement in a core or mold binder, coating or paste for the production of castings.

This application is a continuation in part of my co-pending applications Serial Nos. 332,225 and 332,226, and those executed concurrently with this application and filed upon the same date.

In the said applications employing rubber as a constituent of, or binders, coatings or paste a substantial component of rubber is required to produce a given result both as to its binding or adhesive properties as well as to attain the requisite action or reaction due to the heat of the cast metals. Rubber is expensive and in order to produce the same or superior results with less rubber content; I have made substantial investigation and research; as a result of which I have discovered that with rubber alone as the binding ingredient of the mixture or composition recited in my aforesaid co-pending applications results in the compressive strengths in lbs. per square inch of the mold and/or core produced thereby which are stated in column 1 of the following table; such strength being attained in the period of time before testing stated in column 2 opposite each amount stated in column 1. Column 3 of the following table gives substantially the compressive strength in lbs. per square inch of the mold and/or core made in accordance with my present invention and attained in the time stated in column 2.

| | At once | |
|---|---|---|
| 2.5 | At once | 2.7 |
| 5.0 | ½ hour | 5.2 |
| 5.7 | 1 | 6.65 |
| 7.0 | 1½ | 8.2 |
| 7.5 | 2 | 9.1 |
| 8.0 | 2½ | 10.3 |
| 8.8 | 3 | 10.5 |
| 8.75 | 3½ | 11.4 |
| 9.0 | 4 | 12.5 |
| 8.8 | 4½ | 12.7 |
| 9.0 | 5 | 13.7 |
| 8.1 | 24 | 15.2 |

In my present invention I have dissolved meta-toluylene-diamine in sufficient ether to effect solution. Of this solution I take 0.25 per cent on the basis of the rubber present in my core or mold binder, coating or paste, and mix the same together.

I have also employed with this mixture as low as 0.25 per cent of benzidine with satisfactory results.

The rubber content of this mixture is that which is substantially stated in my said copending applications. In this connection it should be borne in mind, however, that where lesser strength in the binder, coating or paste is desired, a lesser rubber constituent should be employed. For instance, in the last item of columns 2 and 3, if a compressive strength of substantially half of that given in the last item of column 3 is desired in the same mold or core which has dried for a period of 24 hours after being made, then substantially half of the rubber content will obtain satisfactory results with the use of a proportionate amount of meta-toluylene-diamine. However, if a compressive strength of 15.2 lbs. per square inch of compressive strength is desired in a mold after being air dried for a period of 24 hours, the same amount of rubber constituent which produced such strength of 8.1 lbs. under like drying conditions will yield said desired strength when and if there be added to the mixture of the core binder, coating, or paste, the aforesaid 0.25 per cent of meta-toluylene-diamine.

When a still greater strength is desired, one of the well-known vulcanizing accelerants together with sulphur may be employed in satisfactory mixture and the desired vulcanization obtained either by air drying or by the application of artificial heat.

Somewhat different results may be obtained with different molding sands but results are definitely attainable with knowledge of the characteristics of the molding sand.

My invention may, at will, be employed as a core binder and mixed with the sand or other particles comprising the great bulk of the mold or core, or the same may be applied as a coating, by brushing, spraying, or otherwise upon the surfaces of the mold or core adapted to come in contact with the cast surfaces, or the same may be used as a paste to cement together different portions of the core or mold.

The castings produced from such molds and/or cores are more satisfactory and economical than have heretofore been obtainable under commercial foundry practices.

With my present invention like conditions of strength may be readily obtained with substantially less rubber content.

While it has been stated that 0.25 per cent of meta-toluylene-diamine is used on the basis of the rubber present, this is to be understood as meaning that satisfactory results have been attained by me by this percentage of said ingredient.

I have used more of the meta-toluylene-diamine content than said 0.25 per cent, and others may employ greater amounts satisfactorily considering the character of the molding sand and the characteristics of the mold or core.

A core binder, coating or paste is a composition separately marketed to the metal foundry trade, while molds and cores are made by the foundry with the use of such binder, coating or paste for the production of metal castings whose heat reaction with the constituents of the binder, coating or paste produces new, unexpected and advantageous results and substantial savings in the cost of cleaned castings despite the substantially higher cost of the materials employed by applicant. This result includes the fact that my core binder, coating or paste retains in the mold or core its binding characteristics until after the mold or core has been subjected for a period to the heat of the metal cast in or about such mold or core, which greatly reduces the cleaning cost of the castings and enables the mold or core constituents, sand or the like, to be re-used for the making of other molds or cores without the necessity of the same being ground or re-pulverized.

The invention herein described may be manufactured and used by or for the Government of the United States for governmental purposes without the payment to me of any royalty thereon or therefor.

Having now so fully described my invention that others skilled in the art may therefrom make and use the same, what I claim and desire to secure by Letters Patent is:

1. A core binder, coating, or paste containing rubber and meta-toluylene-diamine.

2. A core binder, coating, or paste containing substantially rubber and 0.25 per cent of meta-toluylene-diamine on the basis of the rubber present therein.

3. A core binder, coating, or paste containing rubber, meta-toluylene-diamine and sulphur.

4. A core binder, coating, or paste containing rubber, 0.25 per cent of meta-toluylene-diamine, on the basis of said rubber content and sulphur.

5. A mold or core containing rubber and meta-toluylene-diamine.

6. A mold or core containing rubber and 0.25 per cent of meta-toluylene-diamine on the basis of the rubber present therein.

7. The method of producing molds or cores including the steps of making the mold or core with a rubber and meta-toluylene-diamine content and drying the mold or core to the extent necessary to produce the strength desired therein.

8. The method of making a mold or core including the steps of providing the mold or core with a content of liquid rubber and substantially 0.25 per cent of meta-toluylene-diamine on the basis of the rubber present therein, and drying the mold or core to the extent required to produce the desired strength.

9. The method of making the mold or core including the step of providing such mold or core with a content of rubber, meta-toluylene-diamine, and sulphur.

10. The method of making the mold or core including the steps of providing such mold or core with a content of rubber, meta-toluylene-diamine, and sulphur and vulcanizing accelerant, and vulcanizing same before using the mold or core.

11. The method of casting metals including the steps of casting hot metal in contact with a mixture of rubber and meta-toluylene-diamine.

12. The method of casting metals including the steps of casting hot metal in contact with a mixture of rubber and 0.25 per cent meta-toluylene-diamine on the basis of the rubber present.

13. The method of casting metals including the step of casting hot metal in contact with rubber and 0.25 per cent meta-toluylene-diamine on the basis of the rubber present, and sulphur sufficient normally to produce vulcanization of the rubber content.

CHARLES MARSHALL SAEGER, Jr.